(12) United States Patent
George et al.

(10) Patent No.: US 9,550,523 B2
(45) Date of Patent: Jan. 24, 2017

(54) DETECTION OF CHANGE IN SURFACE FRICTION USING ELECTRIC POWER STEERING SIGNALS

(71) Applicant: STEERING SOLUTIONS IP HOLDING CORPORATION, Saginaw, MI (US)

(72) Inventors: Mariam Swetha George, Saginaw, MI (US); Shrenik P. Shah, Saginaw, MI (US); Farhad Bolourchi, Novi, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/746,041

(22) Filed: Jun. 22, 2015

(65) Prior Publication Data

US 2015/0367884 A1    Dec. 24, 2015

Related U.S. Application Data

(60) Provisional application No. 62/016,393, filed on Jun. 24, 2014.

(51) Int. Cl.
*B62D 6/00* (2006.01)
*B60W 10/20* (2006.01)
(Continued)

(52) U.S. Cl.
CPC .............. *B62D 6/006* (2013.01); *B60W 10/18* (2013.01); *B60W 10/20* (2013.01); *B60W 30/02* (2013.01);
(Continued)

(58) Field of Classification Search
CPC ........... B62D 6/006; B62D 6/008; B62D 6/04; B62D 6/10; B60W 10/18; B60W 10/20; B60W 40/068; B60W 2400/00; B60W 2550/148; B60W 2710/18; B60W 2710/20; B60W 30/02
(Continued)

(56) References Cited

U.S. PATENT DOCUMENTS 5,828,973 A * 10/1998 Takeuchi ............. B62D 5/0466
180/412
6,134,490 A * 10/2000 Ito ........................ B62D 5/0463
180/443
(Continued)

FOREIGN PATENT DOCUMENTS

EP    1275937 A2    1/2003
EP    1640246 A2    3/2006
EP    2177421 A2    4/2010

OTHER PUBLICATIONS

Extended European Search Report for related European Application No. 15173204.7; dated Dec. 1, 2015; 7 pages.

*Primary Examiner* — Atul Trivedi
(74) *Attorney, Agent, or Firm* — Cantor Colburn LLP (57) ABSTRACT

A system and a method of controlling a power steering system of a vehicle are provided. A control system includes a control module operable to receive sensor data and control the power steering system. The control module is configured to determine whether the vehicle is operating in a low surface friction condition based on a handwheel angle and one of a handwheel torque and a pinion torque. The control module generates a control signal based on the determination and sends the control signal to the power steering system.

17 Claims, 10 Drawing Sheets (51) Int. Cl.
  *B60W 30/02* (2012.01)
  *B60W 10/18* (2012.01)
  *B62D 6/04* (2006.01)
  *B62D 6/10* (2006.01)
  *B60W 40/068* (2012.01)

(52) U.S. Cl.
  CPC ............ *B60W 40/068* (2013.01); *B62D 6/008* (2013.01); *B62D 6/04* (2013.01); *B62D 6/10* (2013.01); *B60W 2400/00* (2013.01); *B60W 2550/148* (2013.01); *B60W 2710/18* (2013.01); *B60W 2710/20* (2013.01)

(58) Field of Classification Search
  USPC .......................................................... 701/41
  See application file for complete search history.

(56) References Cited

U.S. PATENT DOCUMENTS

| | | | | |
|---|---|---|---|---|
| 8,434,583 | B2* | 5/2013 | Wilson-Jones | B62D 5/0469 180/443 |
| 2003/0024759 | A1* | 2/2003 | Williams | B62D 5/0463 180/443 |
| 2004/0019417 | A1* | 1/2004 | Yasui | B60G 17/0195 701/36 |
| 2008/0097668 | A1* | 4/2008 | Tsuchiya | B62D 6/003 701/42 |
| 2008/0114515 | A1* | 5/2008 | Hara | B62D 5/0466 701/42 |
| 2008/0142293 | A1* | 6/2008 | Goto | B62D 6/008 180/446 |
| 2008/0294313 | A1* | 11/2008 | Aoki | B62D 5/0463 701/43 |
| 2009/0192679 | A1* | 7/2009 | Kobayashi | B62D 5/0463 701/42 |
| 2009/0271069 | A1* | 10/2009 | Yamamoto | B62D 6/008 701/41 |
| 2011/0093164 | A1* | 4/2011 | Kobayashi | B62D 5/0466 701/29.2 |
| 2012/0191301 | A1* | 7/2012 | Benyo | B62D 5/0481 701/41 |
| 2013/0073146 | A1* | 3/2013 | Konomi | B62D 5/0472 701/41 |
| 2013/0253770 | A1* | 9/2013 | Nishikawa | B62D 6/003 701/41 |
| 2013/0261894 | A1* | 10/2013 | Kojima | B62D 5/0463 701/41 |

* cited by examiner

DETECTION OF CHANGE IN SURFACE FRICTION USING ELECTRIC POWER STEERING SIGNALS

CROSS-REFERENCES TO RELATED APPLICATIONS

This patent application claims priority to U.S. Provisional Patent Application Ser. No. 62/016,393, filed Jun. 24, 2014, which is incorporated herein by reference in its entirety.

BACKGROUND

Conventional methods of estimating road surface friction use wheel slip computed from non-electric power steering (EPS) sensor signals. Different approaches for estimating a change in the road surface friction include (1) use of differences in the wheel velocities and the wheel slip, (2) use of vehicle yaw and lateral acceleration sensors, (3) use of optical sensors at the front of a vehicle which use reflection from the road surface to estimate the road friction, (4) use of acoustic sensors to detect tire noise which gives information about the surface, and (5) use of sensors at the tire threads to measure stress and strain which may be referred back to a surface friction.

In most cases, all of these approaches are expensive, are very much dependent on tire signals, or provide a late detection. It is important that the driver gets friction feedback, but friction information is also needed for other functions like EPS feel/torque synthesis, autonomous intelligent cruise control, and collision avoidance systems.

SUMMARY OF THE INVENTION

In one exemplary embodiment of the present invention, a control system for a power steering system of a vehicle is provided. The control system includes a control module operable to receive sensor data and control the power steering system. The control module is configured to determine whether the vehicle is operating in a low surface friction condition based on a handwheel angle and one of a handwheel torque and a pinion torque. The control module generates a control signal based on the determination and sends the control signal to the power steering system.

In another exemplary embodiment of the present invention, a method of controlling a power steering system of a vehicle is provided. The method includes determining whether the vehicle is operating in a low surface friction condition based on a handwheel angle and one of a handwheel torque or a pinion torque. A control signal is generated based on the determination of whether the vehicle is operating in a low surface friction condition. The control signal is sent to the power steering system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

In exemplary embodiments of the invention, a method and a system use electric power steering (EPS) signals such as a handwheel angle (HWA) signal, a pinion torque (PT) signal, and a handwheel torque (HWT) signal to determine the tire-road friction (i.e., surface friction). As the system and the method of various embodiments of the invention detect a change in surface friction, the system and the method may be used to detect conditions where the vehicle might lose traction, and take appropriate preventive measures through an EPS system, an anti-lock braking system (ABS), and/or an electronic stability control (ESC) system. Detecting a slip caused by handwheel induced maneuvers using the EPS signals may be faster than detecting a slip using a yaw rate and a lateral acceleration because the yaw rate and the lateral acceleration signals follow the EPS signals. Detecting a slip using the EPS signals therefore provides an inexpensive early warning to the system.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
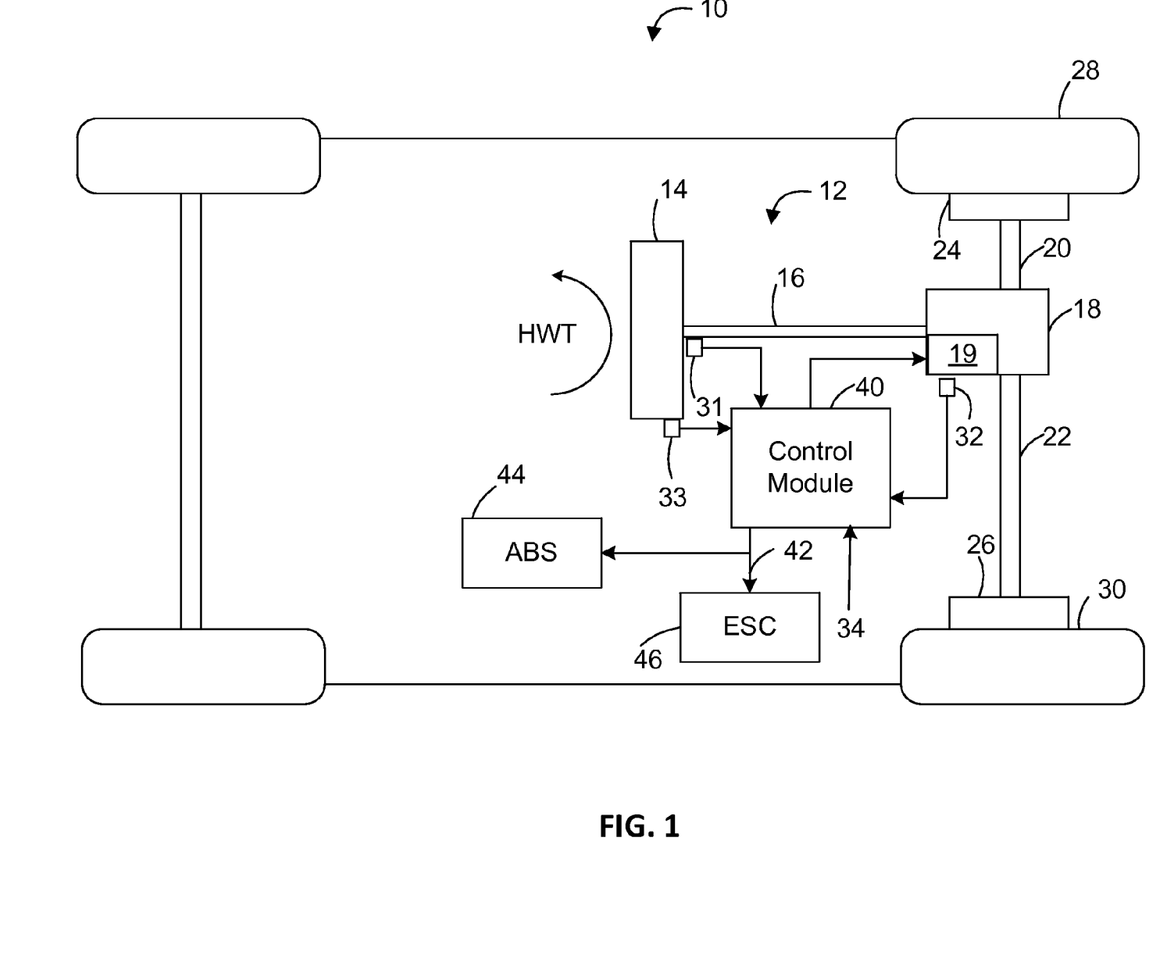
FIG. 1 is a functional block diagram illustrating a vehicle including a steering system in accordance with an embodiment of the invention.

Referring now to FIG. 1, where the invention will be described with reference to specific embodiments without limiting the same, an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints.

In one exemplary embodiment, the steering system 12 is an electric power steering (EPS) system that further includes a steering assist unit 18 that couples to the steering shaft system 16 of the steering system 12 and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as the handwheel 14 is turned by a vehicle operator, the steering actuator motor 19 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor speed sensor that senses a rotational speed of the steering actuator motor 19. The sensor 32 generates a motor speed or velocity signal based thereon. In yet another example, the sensor 33 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

Figure 2:
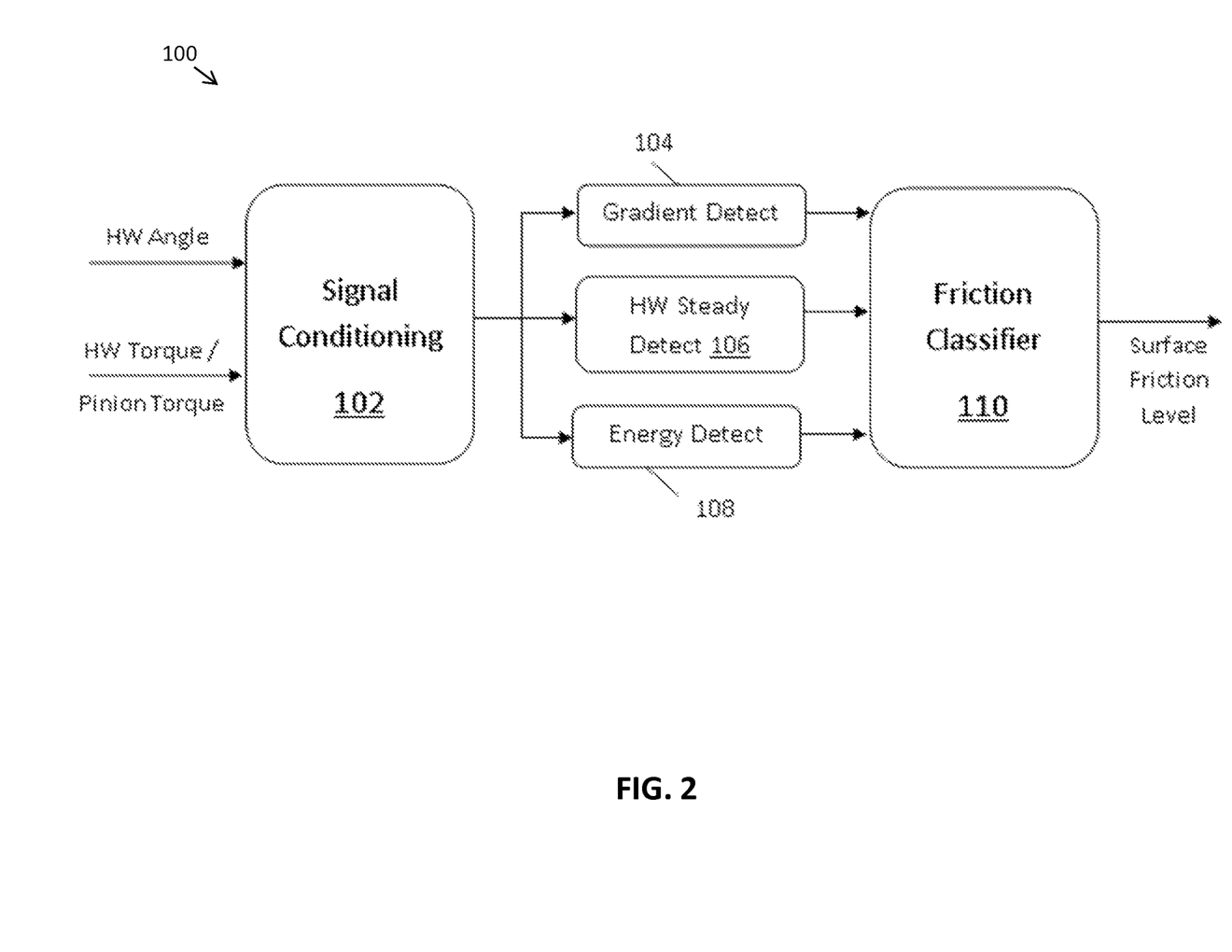
FIG. 2 illustrates a schematic diagram of a control module that detects a surface friction level using several electric power steering (EPS) signals in accordance with an embodiment of the invention.

FIG. 2 illustrates a schematic diagram of a control module 100 that represents a portion of the control logic within the control module 40 of FIG. 1 that detects a surface friction level using several EPS signals. In an embodiment, the control module 100 includes a Signal Conditioning module 102, a Gradient Detect module 104, a Handwheel (HW) Steady Detect module 106, an Energy Detect module 108, and a Friction Classifier module 110. The Signal Conditioning module 102 can perform pre-processing of sensor data, such as a HW angle from sensor 33 and HW torque sensor data from sensor 31 to produce HWA, HWT and/or Pinion Torque, as well as derivative/delta values, and/or handwheel and vehicle speed. In one embodiment, pinion torque can be derived by combining HWT and other internal EPS signals. Each of the modules 102-110 can be implemented as non-transitory executable instructions in memory of the control module 100 or formed in hardware and may be executed by one or more processing circuits of the control module 100. The outputs of the Gradient Detect module 104, the HW Steady Detect module 106, and the Energy Detect module 108 are used to estimate surface friction levels as will be described in more details further below by reference to FIGS. 7-10.

Figure 3:
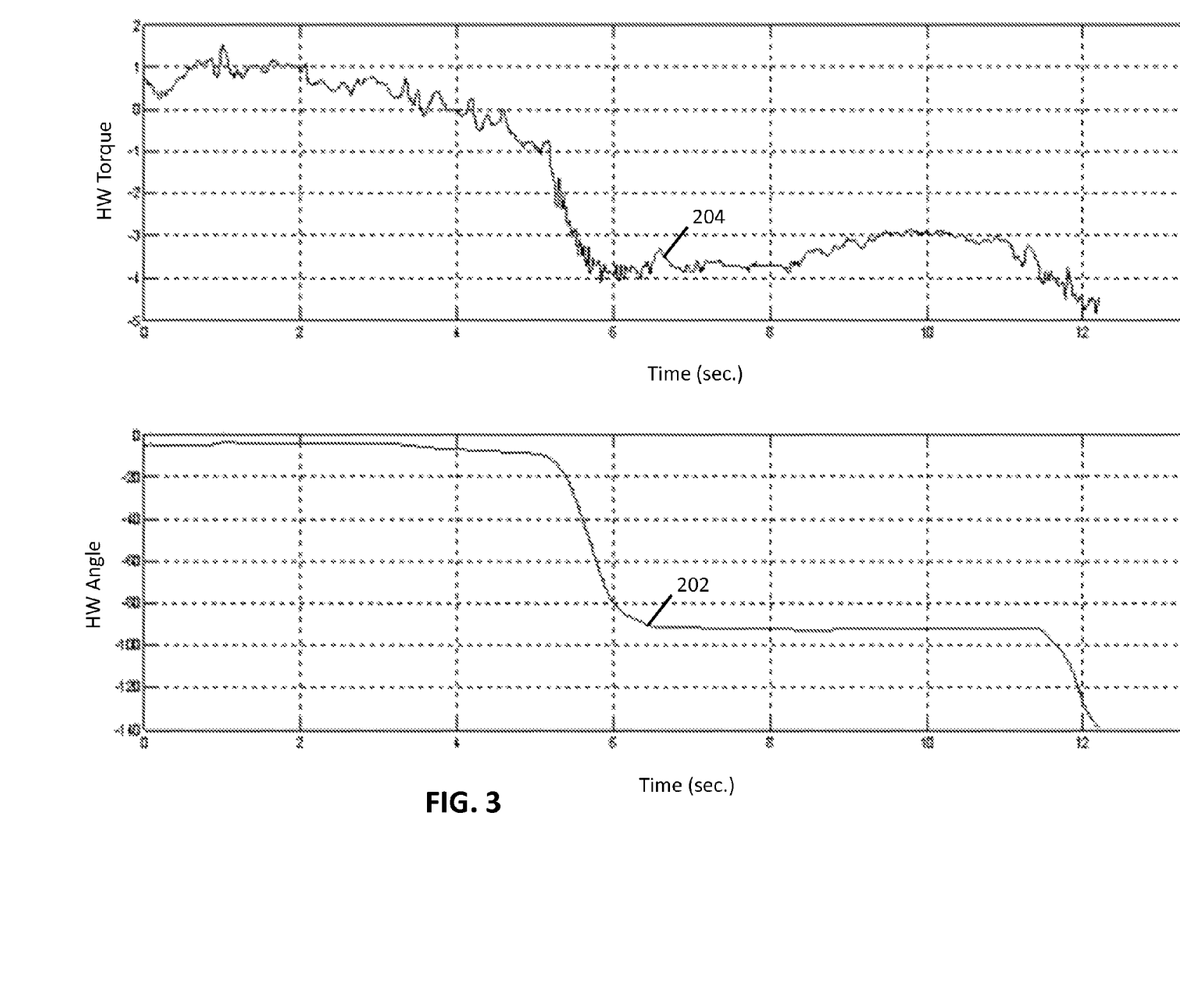
FIG. 3 illustrates Handwheel Angle (HWA) and Handwheel Torque (HWT) data on a dry surface according to an embodiment of the invention.
Figure 4:
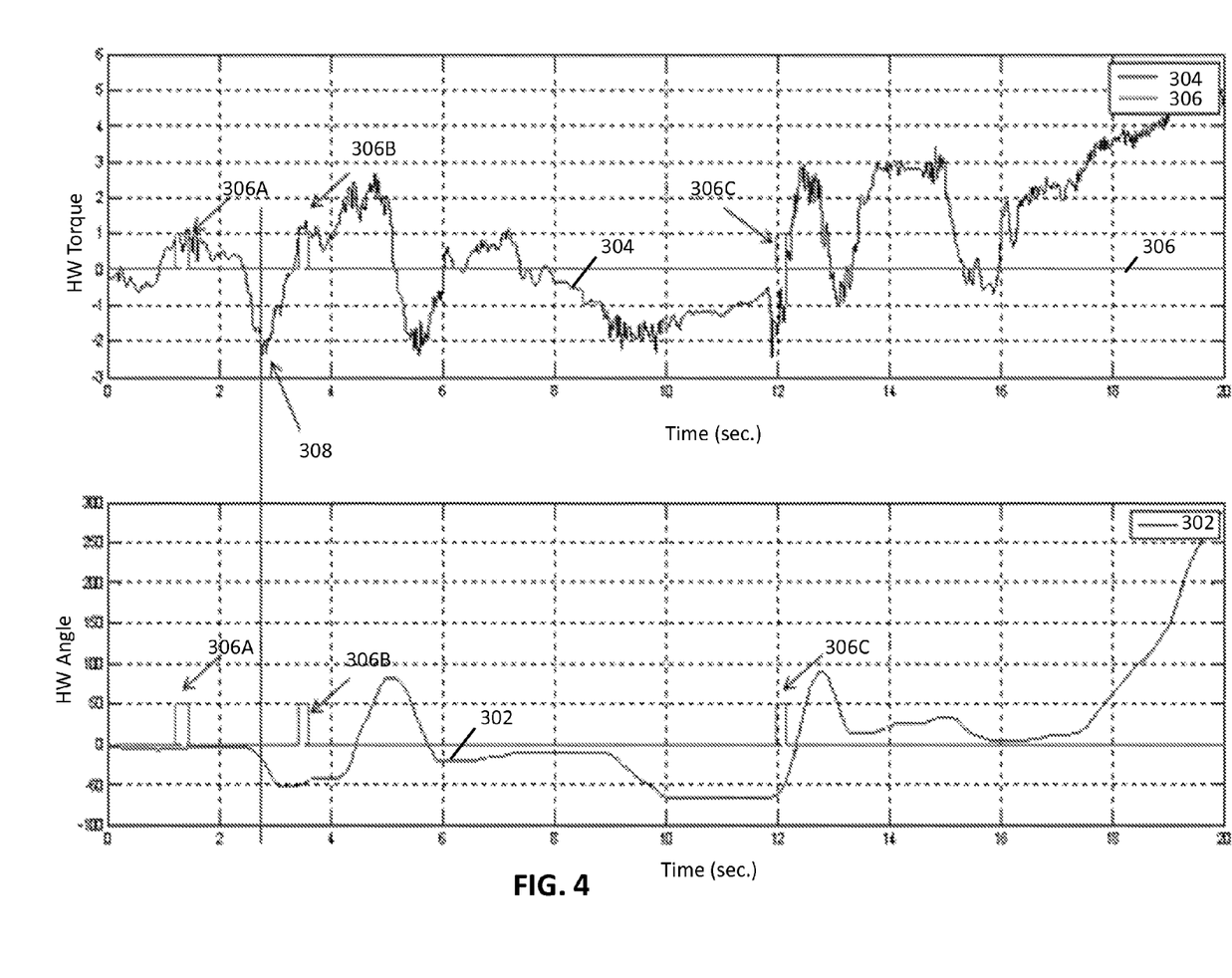
FIG. 4 illustrates HWA and HWT data on a low μ (Mu) surface according to an embodiment of the invention.

In order to devise a method to measure the friction of a road surface, various EPS signal data was collected. FIG. 3 shows HWA data 202 (handwheel angle in degrees) and HWT data 204 (handwheel torque in Newton-meters) on a dry surface over a period of time. It is observed from FIG. 3 that for a linear increase in HWA, there is a corresponding increase in HWT on a dry surface. However, as shown in FIG. 4, on a lower μ (Mu) surface (i.e., a surface with a low coefficient of friction—e.g., an icy road), an increase in HWA does not correspond to a change in HWT because the friction is reduced. More specifically, FIG. 4 depicts HWA data 302 (handwheel angle in degrees) and HWT data 304 (handwheel torque in Newton-meters) for a number of events 306 occurring over a period of time at a low coefficient of friction. At event 306A, the vehicle 10 of FIG. 1 travels onto an icy surface. Upon reaching time 308, it can be observed that as HWA increases, there is an abrupt change in HWT. At event 306B, slip is felt by the driver operating the vehicle 10. At event 306C, the vehicle 10 exits the icy surface and transitions to a dry surface.

Figure 5:
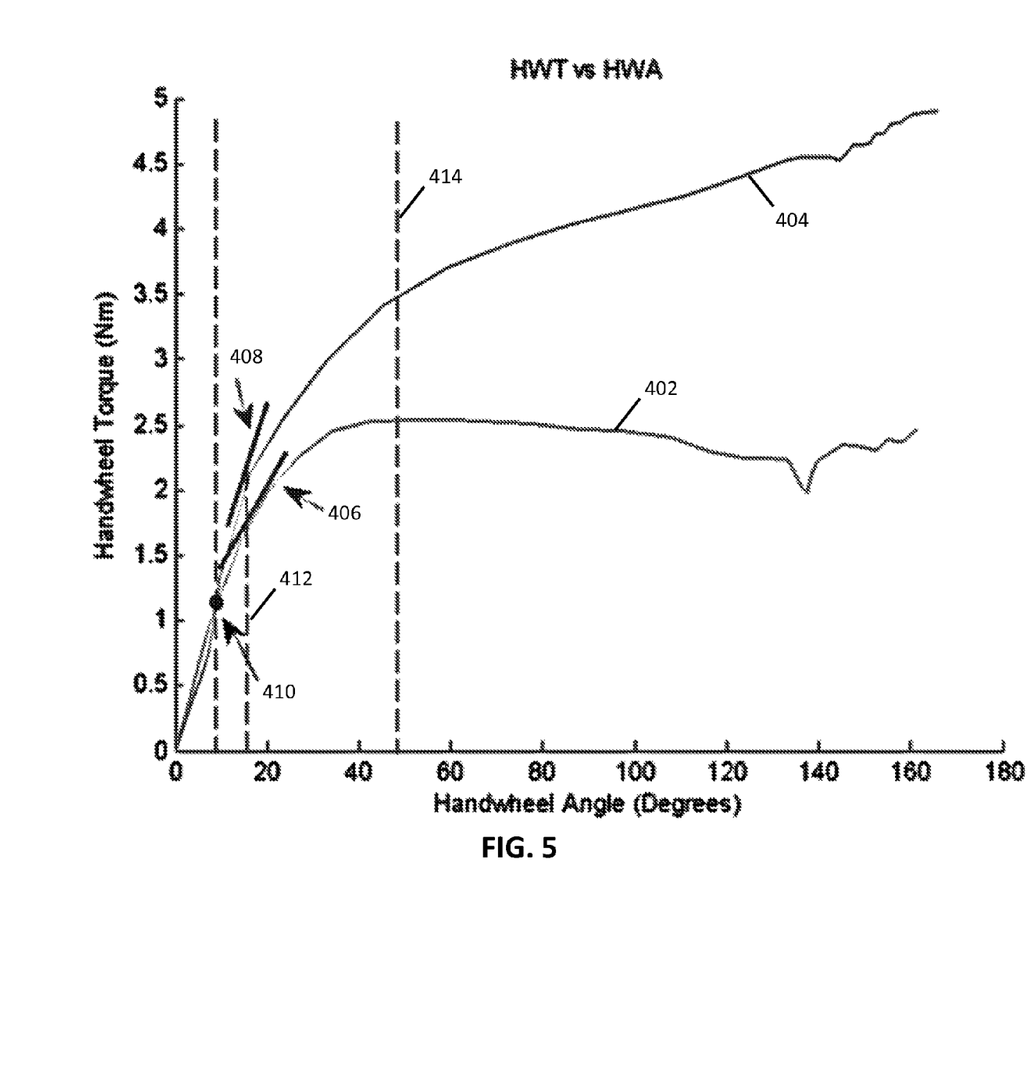
FIG. 5 illustrates a graph that shows a relationship between HWT and HWA when plotted for various road surface friction levels according to an embodiment of the invention.

The relationship between HWT and HWA when plotted for various road surface friction levels is shown by a graph illustrated in FIG. 5. It is seen from this graph that the initial slope of HWT vs. HWA may be used to distinguish the road surfaces at lower handwheel angles. For example, an initial slope value 406 may be calculated for a low mu value 402, e.g., an icy surface, and an initial slope value 408 may be calculated for a high mu value 404, e.g., dry pavement, at a HWA that is slightly above a minimum discernable angle 410. The minimum discernable angle 410 is the angle above which any surface friction may be estimated. That is, only beyond this angle the gradient values for various friction surfaces are different. It is understood that this angle would change according to several factors such as a vehicle speed. In the example of FIG. 5, the minimum discernable angle 410 is about 10 degrees and the initial slope values 406 and 408 are computed with respect to a change between the minimum discernable angle 410 and an offset 412 of about five degrees. The torque magnitude levels can also be used to distinguish the surfaces above a torque magnitude threshold 414, which is at about 50 degrees in the example of FIG. 5.

Figure 6:
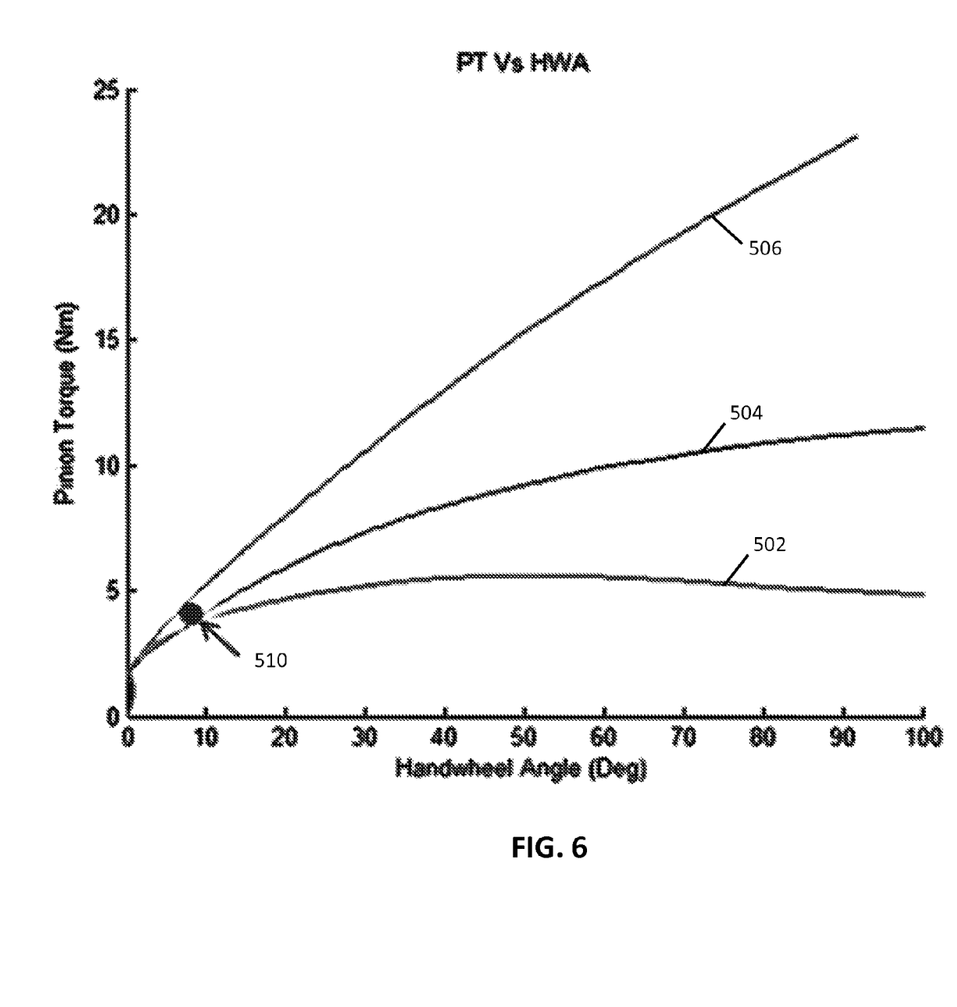
FIG. 6 illustrates a graph that shows a relationship between Pinion Torque (PT) and HWA when plotted for various road surface friction levels according to an embodiment of the invention.

The relationship between PT and HWA when plotted for various road surface friction levels is shown by a graph illustrated in FIG. 6. The two graphs illustrated in FIGS. 5 and 6 show that either PT or HWT may be used for differentiating surface friction levels. Hence, in all equations described in this disclosure, Torque ($T_q$) means either PT or HWT. The graph illustrated in FIG. 6 shows that multiple surface levels of friction may be differentiated based on varying $T_q$ level with HWA. For example, a surface with a low mu value, such as ice, has a lower slope than a mid-range mu value 504 of a snowy surface, and a higher mu value 506, such as dry pavement, has a higher slope. The mid-range mu value 504 can still be considered as a low surface friction condition relative to the higher mu value 506. As in the example of FIG. 5, a minimum discernable angle 510 can be defined as the angle above which any surface friction may be estimated for a PT vs. HWA relationship.

Figure 7:
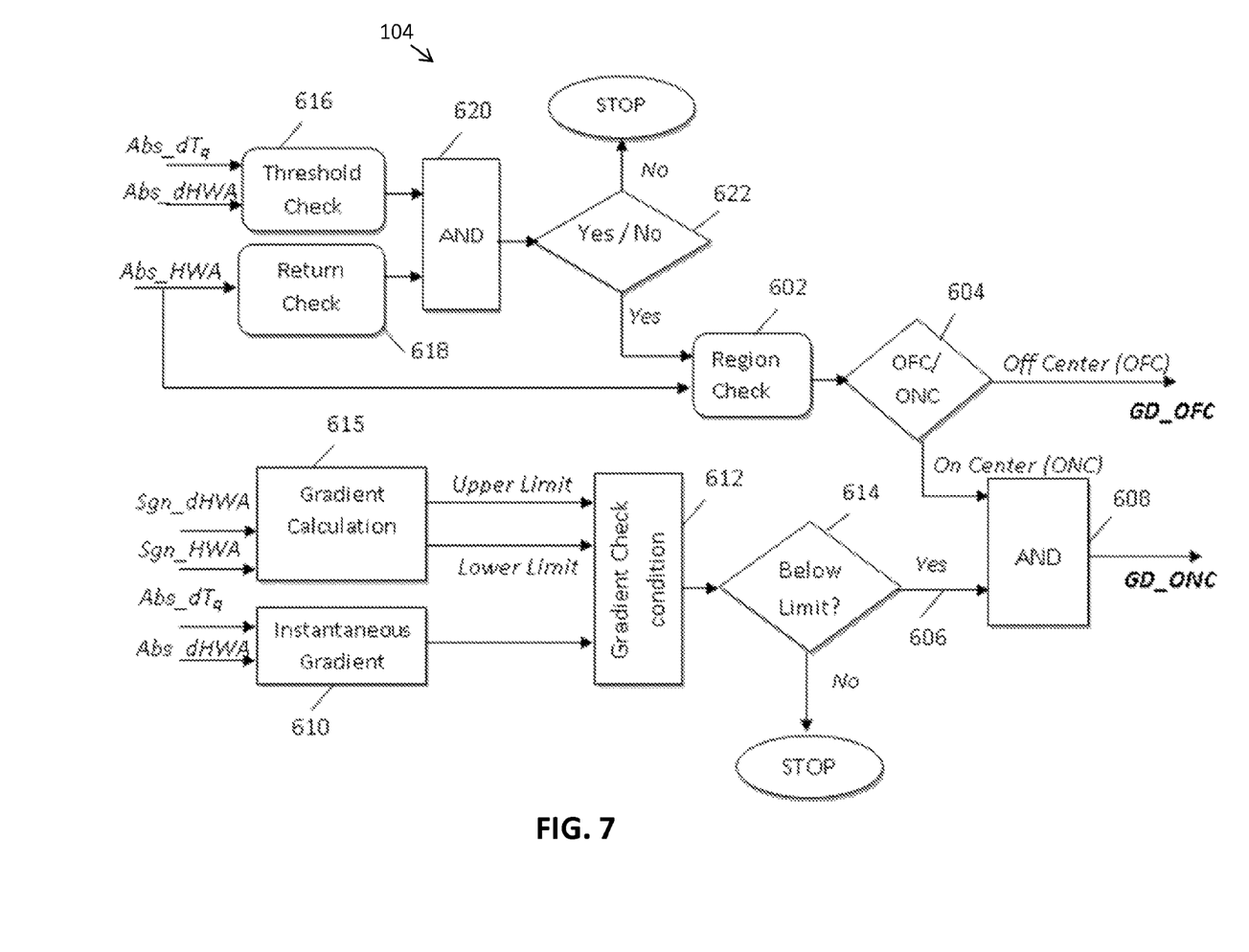
FIG. 7 illustrates a schematic diagram of a Gradient Detect module according to an embodiment of the invention.

FIG. 7 illustrates a schematic diagram of the Gradient Detect module 104 of FIG. 2. In various embodiments, the Gradient Detect module 104 may operate in two modes including one mode for lower handwheel angles (e.g., <50 degrees) and another mode for higher handwheel angles (e.g., >50 degrees). In an embodiment, a region check 602 determines whether the handwheel position (i.e., handwheel angle) is on-center (ONC) for lower angles or off-center (OFC) for higher angles. If the region check 602 indicates that the absolute value of the handwheel angle (Abs_HWA) is OFC for higher angles, decision block 604 sets a gradient detect OFC indicator (GD_OFC). If region check 602 indicates that the absolute value of the handwheel angle (Abs_HWA) is ONC for lower angles, the decision block 604 sets an ONC indicator that is compared with gradient logic output 606 at an AND gate 608 to determine whether to set a gradient detect ONC indicator (GD_ONC).

In an embodiment, the term "gradient" is defined as the amount of Torque ($T_q$) needed to turn the handwheel 14 of FIG. 1 by a certain angle as shown by the following equation:

$$\text{Gradient} = \frac{\Delta Tq}{\Delta HWA}$$

As shown by the graph in FIG. 5, at the lower handwheel angles (e.g., below torque magnitude threshold 414 of FIG. 5), a gradient value may be used as a differentiating measure for the surfaces with different friction levels. The graph of FIG. 5 shows that the gradient value changes with HWA. In an embodiment, the following HWA-based gradient table is formulated:

TABLE 1

HWA-based Gradient table

| HWA(Degrees) | Gradient (Newton Meter/Radian) |
|---|---|
| 0 | 6 |
| 6 | 4.5 |
| 12 | 3.5 |
| 24 | 2 |
| 36 | 1 |
| 48 | 0 |
| 60 | 0 |
| 90 | 0 |
| 360 | 0 |

This calibratable interpolated table (Table 1) has the lowest possible gradient value at a particular handwheel angle obtained by testing on a high friction surface. In an alternate embodiment, the HWA-based gradient table can be a multivariate table that interpolates based on multiple variables, such as HWA, vehicle speed, and handwheel speed.

Referring again to FIG. 7, the Gradient Detect module 104 in the on-center (lower HWA) mode computes an HWA-dependent gradient value which is used as a reference to differentiate between friction levels. In an embodiment, an instantaneous gradient value 610 is calculated and compared with the output from the interpolated table (Table 1) at gradient check condition 612. If the instantaneous gradient value 610 is less than the upper limit table values generated by gradient calculation 615 and more than lower limit table values generated by gradient calculation 615 in gradient check condition 612, then decision block 614 sets the gradient logic output 606 and the on-center gradient detect signal (GD_ONC) is triggered. A threshold check 616 and a return check 618 shown in FIG. 7 add a protection layer so that there are no false triggers. In an embodiment, the return check 618 checks if the handwheel 14 is moving toward or away from the center based on the absolute value of HWA (Abs_HWA). This check ensures that Gradient Detect module 104 is active only when the driver is taking a turn or the handwheel 14 is moving away from the center. In an embodiment, the threshold check 616 checks ΔHWT and ΔHWA signals (i.e., absolute value of a change in HWT (Abs_dHWT) and absolute value of a change in HWA (Abs_dHWA), respectively) to see if they are above a certain threshold. The Gradient Detect module 104 of an embodiment is active only if both ΔHWT and ΔHWA signals are above a certain threshold (i.e., a threshold value). The threshold for ΔHWT is used to eliminate noise while the threshold for ΔHWA is used to ignore negligible deviations in steering maneuvers. The output of the threshold check 616 and return check 618 are passed to an AND gate 620 followed by a decision block 622 leading to the region check 602 when both the threshold check 616 and the return check 618 are satisfied.

The following conditions are examples of on-center gradient detection conditions:

$$\left(\frac{\Delta Tq}{\Delta HWA}\right)_{slippery} < \left(\frac{\Delta Tq}{\Delta HWA}\right)_{dry}$$

$$\text{Let } \left(\frac{\Delta Tq}{\Delta HWA}\right)_{dry(Ideal)} = G_d$$

$$\left(\frac{\Delta Tq}{\Delta HWA}\right)_{slippery} < G_d$$

$$(\Delta Tq)_{slippery} < G_d * (\Delta HWA)_{slippery}$$

This is lower-limited by a noise threshold.

$$\text{Noise Threshold} < (\Delta Tq)_{slippery} < G_d * (\Delta HWA)_{slippery} \quad (1)$$

$$\text{Small angle deviations} < (\Delta HWA)_{slippery} \quad (2)$$

In an exemplary embodiment, the on-center gradient detect is triggered when both conditions (1) and (2) are satisfied and the steering is moving away from center.

As depicted in FIG. 5, at higher handwheel angles, the difference in the gradient values for a low friction surface and a high friction surface is very small to characterize. Above a certain HWA, gradient values may not be used as a differentiating factor between the surface friction levels. Therefore, above the certain HWA, the off-center gradient detect of an embodiment just checks for ΔHWT and ΔHWA thresholds and whether the steering is returning to the center or not according to the following conditions:

$$\text{Noise Threshold} < (\Delta Tq)_{slippery} \quad (3)$$

$$\text{Small Deviation} < (\Delta HWA)_{slippery} \quad (4)$$

The off-center gradient detect is triggered when both conditions (3) and (4) are satisfied and the steering is moving away from center.

Figure 8:
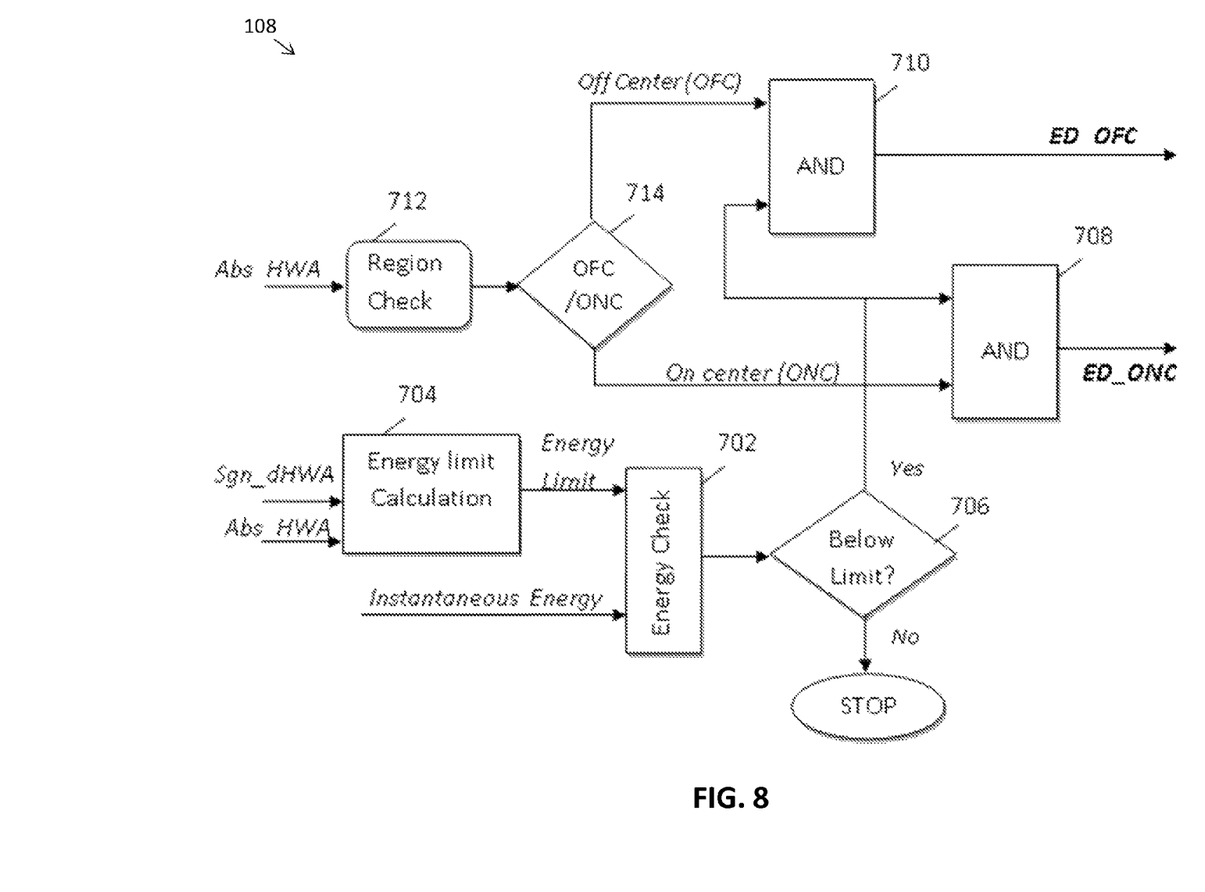
FIG. 8 illustrates a schematic diagram of an Energy Detect module in accordance with an embodiment of the invention.

FIG. 8 illustrates a schematic diagram of the Energy Detect module 108 shown in FIG. 2. In an embodiment, the amount of energy that the Electric Power Steering (EPS) system expends while steering the handwheel 14 is used as an estimate of the surface friction. The energy for steering the handwheel 14 may be estimated by the following equation:

$$Energy = Tq * HWA$$

The graphs illustrated in FIGS. 5 and 6 show that, at higher handwheel angles, gradient values may not be used as a measure to detect changes in friction levels as $T_q$ saturates with $T_q$ and the gradient values become very small. Hence, in an embodiment, the absolute value of $T_q$ is used to differentiate between friction levels at higher handwheel angles. In an embodiment, an energy value is an absolute measure and may be used for this purpose.

At lower handwheel angles, in an embodiment, an energy value as well as a gradient value may be used for detection purposes. Using both values adds robustness to the embodiments of the invention by reducing false detects.

From the graphs illustrated in FIGS. 5 and 6, it is observed that handwheel torque and the energy required to take a turn on surfaces with higher friction are higher. The graphs also show that energy changes with HWA. An HWA-based energy table is formulated:

TABLE 2

HWA-based Energy table

| HWA(Degrees) | Energy (Joules) |
|---|---|
| 10 | 0.4 |
| 18 | 0.9 |
| 24 | 1.2 |
| 36 | 1.8 |
| 40 | 2.3 |
| 50 | 2.5 |
| 60 | 3 |
| 70 | 3.8 |
| 80 | 4.4 |
| 90 | 4.7 |
| 100 | 5.23 |
| 360 | 18.8496 |

This calibratable interpolated table (Table 2) has the lowest possible energy at a particular HWA obtained by testing on a high friction surface. In an alternate embodiment, the HWA-based energy table can be a multi-variate table that interpolates based on multiple variables, such as HWA, vehicle speed, and handwheel speed. In an embodiment, the Energy Detect module 108 computes a HWA-dependent energy, which is used as a reference to differentiate between friction levels. The instantaneous energy is calculated and compared with the output from the interpolated table (Table 2) at energy check 702 vs. an energy limit computed by an energy limit calculation 704 based on a sign of the change in HWA (Sgn_dHWA) and an absolute value of the HWA (Abs_HWA). If the instantaneous energy is lesser than the table values, then the energy detect on-center signal (ED_ONC) is triggered. Hence, energy detect is triggered when the condition (5) below is satisfied:

$$(Tq*HWA)_{slippery} < (Tq*HWA)_{dry(nominal)} \quad (5)$$

The region check 712 shown in FIG. 8 is used to determine whether the handwheel position is on-center (e.g., Abs_HWA<50 degrees) or off-center (e.g., Abs_HWA>50 degrees). Based on the determination, the corresponding detect is triggered through decision block 714. If the decision block 714 determines that HWA is OFC based on region check 712 and the instantaneous energy is below the energy limit as determined by energy check 702 and decision block 706, as gated by AND-gate 710, the energy detect off-center signal (ED_OFC) is set. Similarly, if the decision block 714 determines that HWA is ONC in combination with determining that the energy limit as determined by energy check 702 and decision block 706 is below the limit, then AND-gate 708 delivers the energy detect ONC signal.

Figure 9:
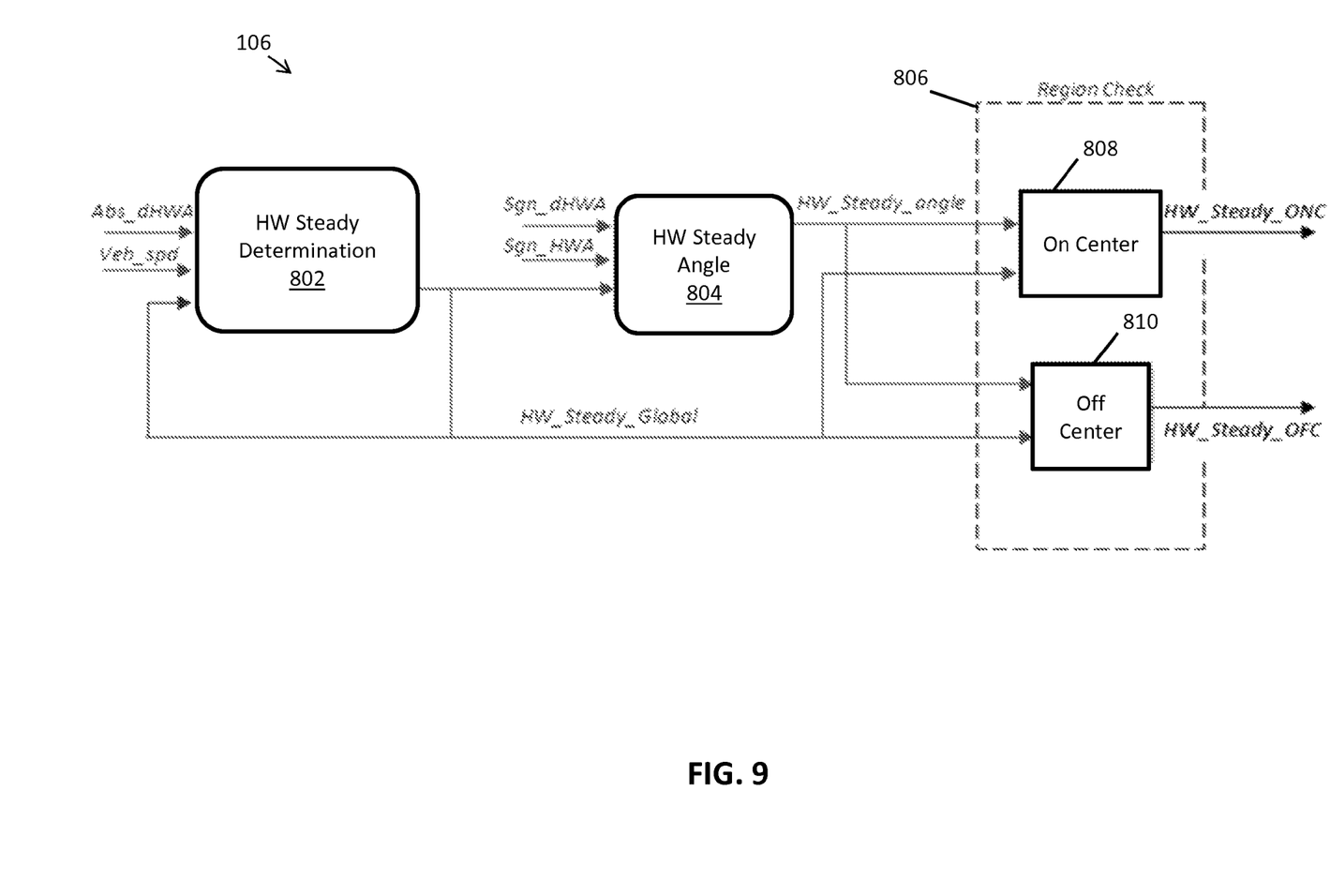
FIG. 9 illustrates a schematic diagram of a Handwheel Steady Detect module in accordance with an embodiment of the invention.

FIG. 9 illustrates a schematic diagram of the HW Steady Detect module 106 shown in FIG. 2. In an embodiment, the HW Steady Detect module 106 detects the steadiness of handwheel 14 of FIG. 1 using HW steady determination 802 that monitors the absolute value of the change in HWA (Abs_dHWA), vehicle speed, a feedback from HW_Steady_Global. Most of the steering maneuvers start by going straight and then taking a turn. In some cases, when the handwheel 14 is at an angle, the driver further turns it away from the center. In an embodiment, the control module 100 detects a change of friction for such steering maneuvers. In an embodiment, the control module 100 would not detect the lower friction levels when the driver is turning the handwheel 14 back towards the center or in a back-and-forth motion. The HW Steady Detect module 106 is focused on capturing these maneuvering conditions in order to determine when the control module 100 is to detect a change of friction.

The global handwheel steady signal (HW_Steady_Global) is triggered when the vehicle 10 moves for a certain distance (i.e., an enough distance to perform calibration) such that the HWA varies less than a certain amount at each sampling instance in time. In an embodiment, the HW Steady Detect module 106 shown in FIG. 9 generates the global handwheel steady signal (HW_Steady_Global). The HW Steady Detect 106 module is also configured to detect repeated back-and-forth maneuvers on the handwheel 14 to avoid false detection. The HW Steady Detect module 106 makes the detection algorithm more robust.

In an embodiment, the HW Steady Detect module 106 shown in FIG. 9 records the angle at which the handwheel 14 becomes steady. HW steady angle 804 determines a handwheel steady angle (HW_Steady_angle) based on a sign of the change in HWA (Sgn_dHWA), a sign of HWA (Sgn_HWA), and the global handwheel steady signal (HW_Steady_Global). This angle is then used to classify the steering position as on-center 808 or off-center 810 with respect to the global handwheel steady signal (HW_Steady_Global), and the corresponding HW Steady signal (HW_Steady_ONC or HW_Steady_OFC) is set based on the classification by region check 806.

Figure 10:
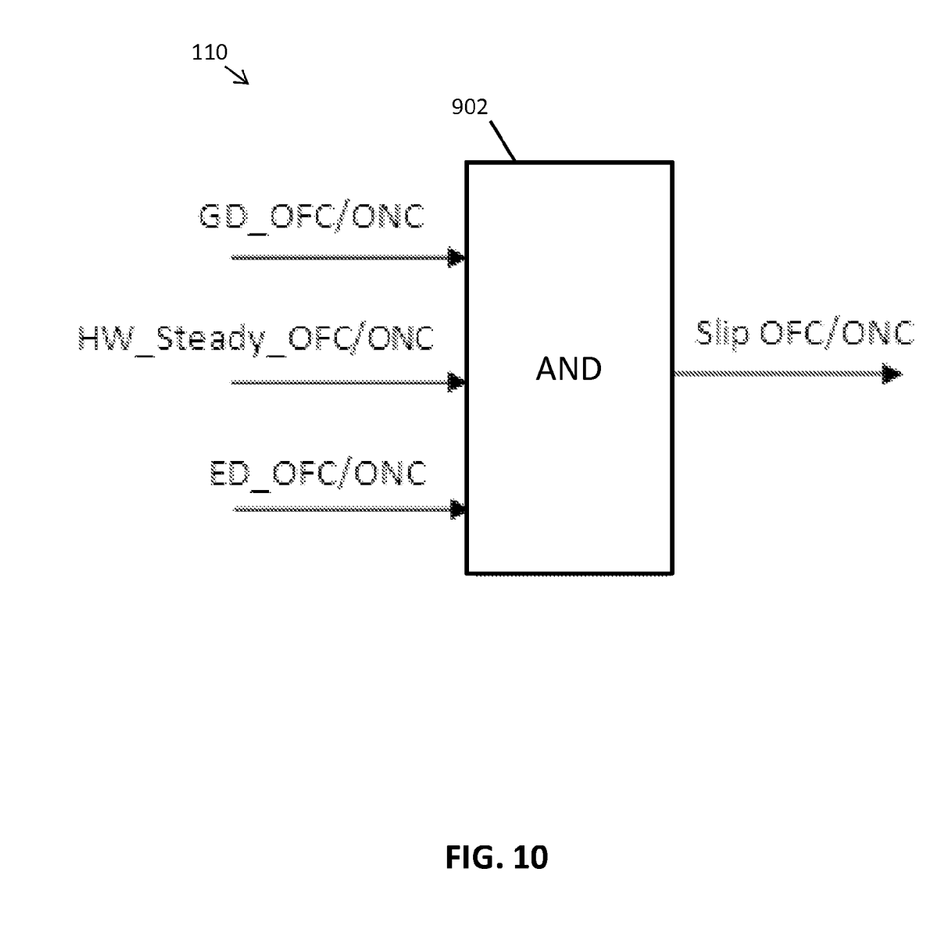
FIG. 10 illustrates a schematic diagram of a Friction Classifier module shown in accordance with an embodiment of the invention.

FIG. 10 illustrates a schematic diagram of the Friction Classifier module 110 shown in FIG. 2. A slip (i.e., a reduction in the surface friction) detect is triggered when all the three signals, namely, Gradient Detect, Energy Detect and handwheel Steady, are high simultaneously. If the three signals are on-center (GD_ONC, HW_Steady_ONC, and ED_ONC) at AND-gate 902, the slip is classified as an on-center slip (Slip ONC). If the three signals are off-center (GD_OFC, HW_Steady_OFC, and ED_OFC) at AND-gate 902, then the slip is classified as an off-center slip (Slip OFC).

While the invention has been described in detail in connection with only a limited number of embodiments, it should be readily understood that the invention is not limited to such disclosed embodiments. Rather, the invention may be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A control system for a power steering system, comprising:
   a control module operable to receive sensor data and control the power steering system, the control module configured to:
   determine whether a vehicle is operating in a low surface friction condition based on a handwheel angle and one of a handwheel torque and a pinion torque;
   generate a control signal based on the determination, the control signal indicating an on-center slip based on a combination of: a gradient detect on-center indicator being set, an energy detect on-center indicator being set for an amount of energy expended while steering, and a handwheel steady on-center indicator being set, and the control signal indicating an off-center slip based on a combination of: a gradient detect off-center indicator being set, an energy detect off-center indicator being set, and a handwheel steady off-center indicator being set; and
   send the control signal to the power steering system.

2. The control system of claim 1, wherein the control module is further configured to determine a gradient value based on the handwheel angle and one of the handwheel torque and the pinion torque.

3. The control system of claim 2, wherein the control module is further configured to perform a region check of the handwheel angle to determine whether the handwheel angle is considered on-center or off-center, where on-center is associated with a lower handwheel angle than off-center.

4. The control system of claim 3, wherein the control module is further configured to set the gradient detect off-center indicator based on an off-center determination by the region check, and the gradient detect on-center indicator is set based on an on-center determination by the region check in combination with the gradient value being below a limit.

5. The control system of claim 3, wherein a threshold check and a return check control activation of the region check based on determining that the handwheel angle is moving toward or away from on-center.

6. The control system of claim 1, wherein the control module is further configured to determine an energy value based on the handwheel angle and one of the handwheel torque and the pinion torque.

7. The control system of claim 6, wherein the control module is further configured to perform a region check of the handwheel angle to determine whether the handwheel angle is considered on-center or off-center, where on-center is associated with a lower handwheel angle than off-center.

8. The control system of claim 7, wherein the control module is further configured to set the energy detect off-center indicator based on an off-center determination by the region check in combination with the energy value being below a limit, and the energy detect on-center indicator is set based on an on-center determination by the region check in combination with the energy value being below the limit.

9. The control system of claim 1, wherein the control module is further configured to determine a steadiness value based on the handwheel angle and a vehicle speed.

10. The control system of claim 9, wherein the control module is further configured to set the handwheel steady on-center indicator or the handwheel steady off-center indicator based on a handwheel steady determination and handwheel steady angle using the vehicle speed, an absolute value of a change in the handwheel angle, a sign of the change in the handwheel angle, and a sign of the handwheel angle.

11. The control system of claim 9, wherein the control module is further configured to prevent detection of the low surface friction condition based on determining that the handwheel angle is returning back toward center or the steadiness value is indicative of the handwheel angle alternating in a back-and-forth motion.

12. A method of controlling a power steering system, the method comprising:
   determining whether a vehicle is operating in a low surface friction condition based on a handwheel angle and one of a handwheel torque or a pinion torque;
   generating a control signal based on the determination whether the vehicle is operating in a low surface friction condition, the control signal indicating an on-center slip based on a combination of: a gradient detect on-center indicator being set, an energy detect on-center indicator being set for an amount of energy expended while steering, and a handwheel steady on-center indicator being set, and the control signal indicating an off-center slip based on a combination of: a gradient detect off-center indicator being set, an energy detect off-center indicator being set, and a handwheel steady off-center indicator being set; and
   sending the control signal to the power steering system.

13. The method of claim 12, wherein the determining whether the vehicle is operating on a low surface friction surface comprises:
   determining a gradient value, an energy value, and a steadiness value based on the handwheel angle and one of the handwheel torque and the pinion torque; and
   determining a slip value as the on-center slip or the off-center slip based on the gradient value, the energy value, and the steadiness value.

14. The method of claim 13, further comprising determining whether the handwheel angle exceeds a threshold value and the determination of the gradient value, the energy value, and the steadiness value is further based on determining whether the handwheel angle exceeds the threshold value.

15. The method of claim 14, further comprising preventing detection of the low surface friction condition based on determining that the handwheel angle is returning back toward center or the steadiness value is indicative of the handwheel angle alternating in a back-and-forth motion.

16. The method of claim 12 further comprising detecting multiple surface levels of friction based on the handwheel angle and one of the handwheel torque and the pinion torque.

17. The method of claim 12 further comprising sending a surface friction level as the control signal to one or more of an anti-lock braking system and an electronic stability control of the vehicle.

* * * * *